US009507116B2

(12) United States Patent
Choi

(10) Patent No.: US 9,507,116 B2
(45) Date of Patent: Nov. 29, 2016

(54) LENS MODULE

(71) Applicant: SAMSUNG ELECTRO-MECHANICS CO., LTD., Suwon-Si (KR)

(72) Inventor: Kwang Yun Choi, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/554,032

(22) Filed: Nov. 25, 2014

(65) Prior Publication Data

US 2015/0146310 A1     May 28, 2015

(30) Foreign Application Priority Data

Nov. 26, 2013  (KR) .......................... 10-2013-0144666
Nov. 20, 2014  (KR) .......................... 10-2014-0162626

(51) Int. Cl.
*G02B 7/02*      (2006.01)
*G02B 13/00*    (2006.01)
*G02B 3/00*      (2006.01)

(52) U.S. Cl.
CPC .............. *G02B 7/021* (2013.01); *G02B 7/022* (2013.01); *G02B 13/004* (2013.01); *G02B 2003/0093* (2013.01)

(58) Field of Classification Search
CPC .......... G02B 2003/0093; G02B 7/021; G02B 7/022

USPC ................................ 359/642, 717, 793–795
See application file for complete search history.

(56) References Cited

U.S. PATENT DOCUMENTS

| | | | | |
|---|---|---|---|---|
| 7,088,530 B1 * | 8/2006 | Recco | .................... | G02B 7/021 359/784 |
| 9,042,040 B2 * | 5/2015 | Kim | ........................ | G02B 3/08 359/741 |
| 2008/0186597 A1 | 8/2008 | Eguchi | | |
| 2009/0303620 A1 | 12/2009 | Abe et al. | | |

FOREIGN PATENT DOCUMENTS

| | | |
|---|---|---|
| JP | 2002-286987 A | 10/2002 |
| JP | 2007-310413 A | 11/2007 |
| JP | 2008-185818 A | 8/2008 |
| JP | 2009-48024 | 3/2009 |
| JP | 4465876 B2 | 3/2010 |

\* cited by examiner

*Primary Examiner* — Darryl J Collins
(74) *Attorney, Agent, or Firm* — NSIP Law

(57) ABSTRACT

In a lens module, a concave portion may be formed on an image-side surface of a first lens, a convex portion protruding toward the concave portion may be formed on an object-side surface of a second lens, an outer region of the concave portion of the first lens and an outer region of the convex portion of the second lens may be closely adhered to each other, the concave portion and the convex portion may be spaced apart from each other, and a gap between the concave portion and the convex portion in an optical axis direction and a gap between the concave portion and the convex portion in a direction perpendicular to an optical axis may be formed so as to be different from each other.

13 Claims, 5 Drawing Sheets

LENS MODULE

CROSS-REFERENCE TO RELATED APPLICATION

This application claims the benefit of Korean Patent Application No. 10-2013-0144666 filed on Nov. 26, 2013, and 10-2014-0162626 filed on Nov. 20, 2014 with the Korean Intellectual Property Office, the disclosures of which are incorporated herein by reference in their entireties.

BACKGROUND

The present disclosure relates to a lens module, and more particularly, to a lens module having improved assembly precision.

Generally, a compact camera module (CCM), having compact size, has been used in various information technology (IT) apparatuses such as portable mobile communications apparatuses including camera phones, personal digital assistants (PDA), smartphones, toy cameras, and the like. Recently, in accordance with consumer demand, the release of apparatuses in which compact camera modules are mounted has increased.

Such compact camera modules are manufactured using an image sensor such as a charge coupled device (CCD), a complementary metal oxide semiconductor (CMOS), or the like, as a main component, and images of subjects are captured via the image sensor, the collected images are stored as data in a memory in an apparatus, and the stored data may be displayed as images via a display medium such as a liquid crystal display (LCD), a personal computer (PC) monitor, or the like, within the apparatus.

The compact camera module is mainly configured of a housing of which a bottom surface is coupled to a board having an image sensor attached thereto and a lens barrel having multistage lenses stacked and coupled therein, wherein the lens barrel is vertically mounted in the housing, and the lens barrel and the housing are coupled by the coupling of male and female screw thread portions provided in inner and outer peripheral surfaces of each member.

However, a compact camera module that has been recently released is configured to have an assembly structure in which the multistage lenses are fitted into the lens barrel. Therefore, a gap clearance between outer portions of the lenses and an inner portion of the lens barrel is increased, and concentricities of the lenses become different from each other.

RELATED ART DOCUMENT (Patent Document 1) Cited Reference: Japanese Patent Laid-Open Publication No. 2007-310413

SUMMARY

An aspect of the present disclosure may provide a lens module capable of decreasing dispersion of resolution of lenses by increasing close adhesion and adhesive force of lenses stacked in a multistage scheme.

An aspect of the present disclosure may also provide a lens module in which a lens barrel may be more compactly configured by closely adhering lenses stacked in a multistage scheme.

In a lens module according to an exemplary embodiment of the present disclosure, a concave portion may be formed on an image-side surface of a first lens, a convex portion protruding toward the concave portion may be formed on an object-side surface of a second lens, an outer region of the concave portion of the first lens and an outer region of the convex portion of the second lens may be closely adhered to each other, the concave portion and the convex portion may be spaced apart from each other, and a gap between the concave portion and the convex portion in an optical axis direction and a gap between the concave portion and the convex portion in a direction perpendicular to an optical axis may be formed so as to be different from each other, whereby deteriorations in resolution may be decreased at the time of assembling lenses and miniaturization of the lens module may be implemented.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
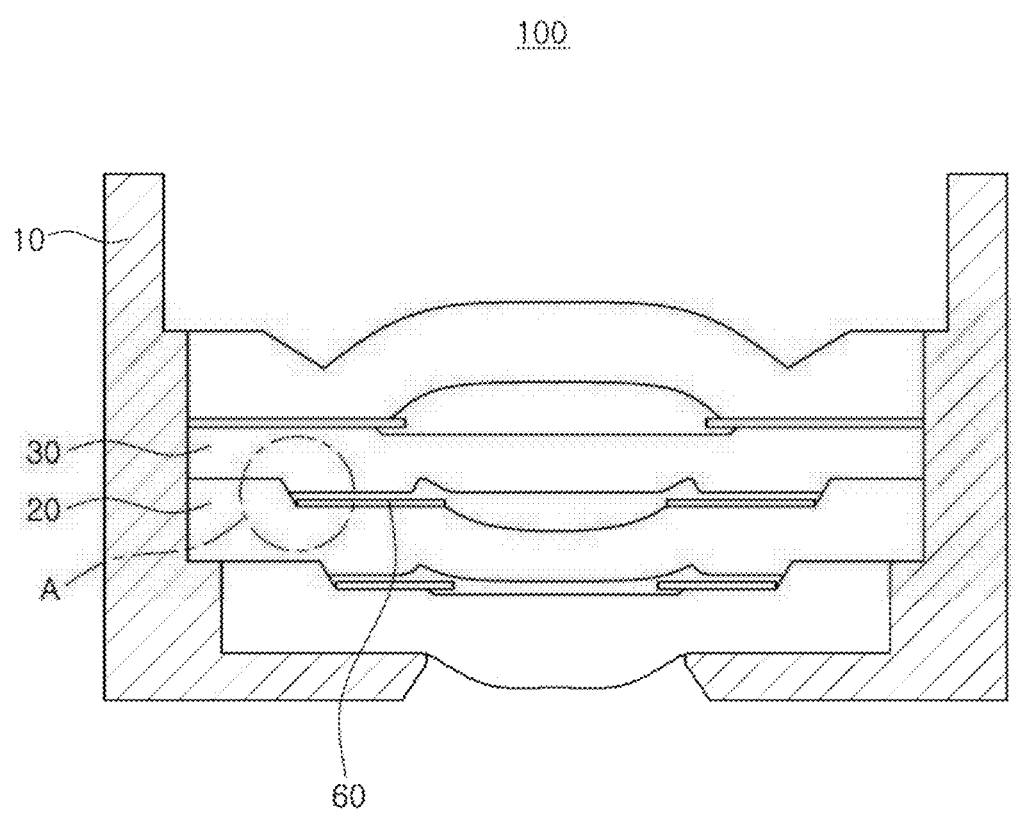
FIG. 1 is a cross-sectional view illustrating a state in which lenses of a lens module according to an exemplary embodiment of the present disclosure are stacked.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

Figure 2:
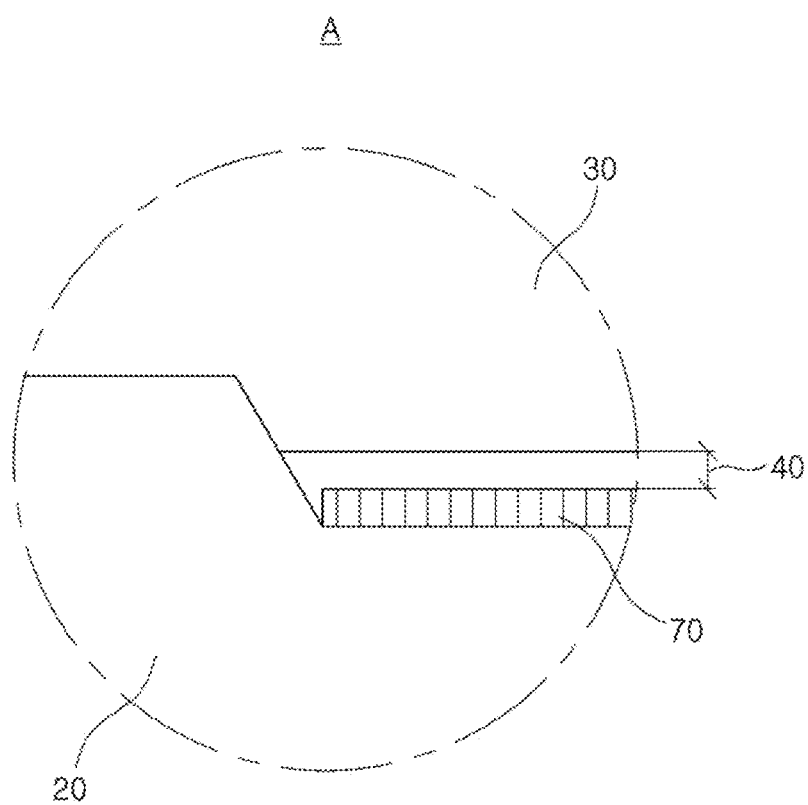
FIG. 2 is an enlarged view of part A of FIG. 1.

FIG. 1 is a cross-sectional view illustrating a state in which lenses of a lens module according to an exemplary embodiment of the present disclosure are stacked; FIG. 2 is an enlarged view of part A of FIG. 1; and FIG. 3 is an enlarged view of another example of part A of FIG. 1.

Figure 3:
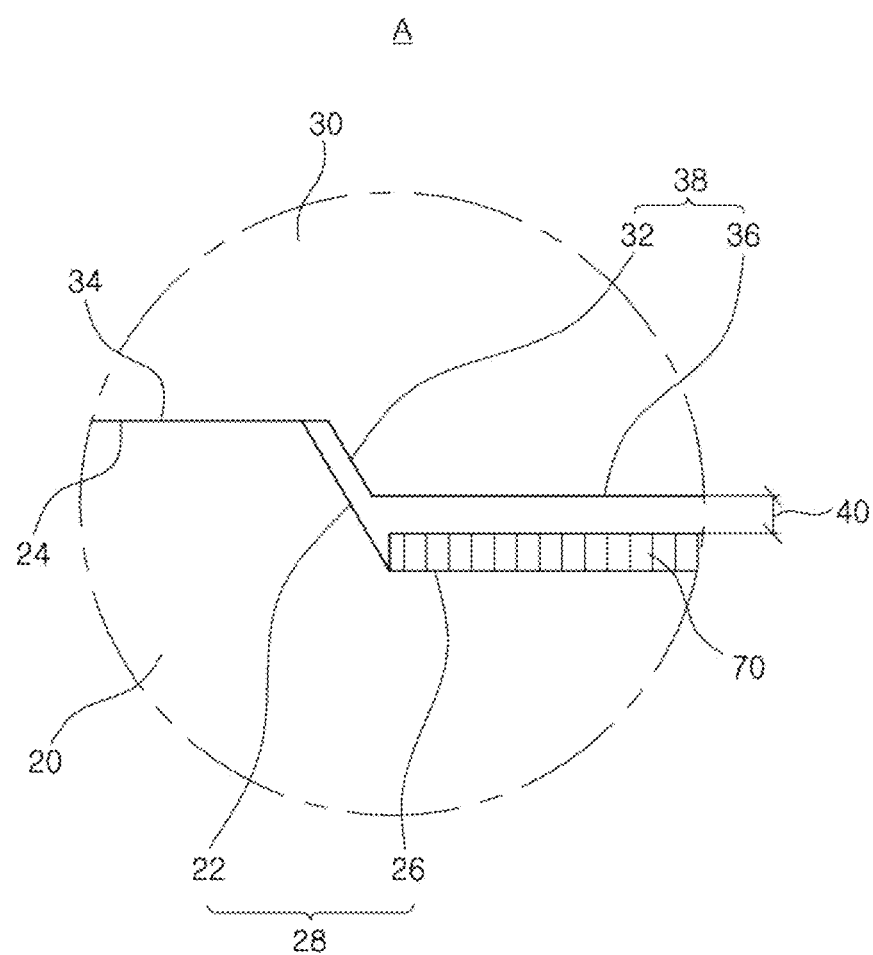
FIG. 3 is an enlarged view of another example of part A of FIG. 1.

As shown in FIGS. 1 through 3, a lens module 100 according to an exemplary embodiment of the present disclosure may include a lens barrel 10 and first and second lenses 20 and 30 accommodated in the lens barrel 10, wherein the second lens 30 is stacked on the first lens 20.

Although the lens module 100 has been described in the present disclosure as having the first and second lenses 20 and 30 stacked, a plurality of lenses may be disposed in the lens barrel 10 in the same structure as the above-mentioned stacked structure, in addition to the second lens 30 stacked on the first lens 20.

Here, a first surface of each lens refers to a surface closest to an object side (or an object-side surface), and a second surface of each lens refers to a surface closest to an image side (or an image-side surface).

The lens barrel 10 may have an accommodating space formed therein and may accommodate at least the first and second lenses 20 and 30 therein.

The first lens 20 accommodated in the lens barrel 10 may be formed by injection-molding a synthetic resin and may generally have an annular shape. The first lens 20 may have an optical axis provided in a central portion thereof in order to form a focus of light introduced from the outside.

The first lens 20 may have a concave portion 28 formed on the second surface thereof. For example, the first lens 20 may have a first conical surface 22, a first inner horizontal surface 26, and a first outer horizontal surface 24 formed on the second surface thereof, wherein the first conical surface 22 is inclined and the first inner horizontal surface 26 and the first outer horizontal surface 24 are formed on both sides of the first conical surface 22, respectively.

The first outer horizontal surface 24 may be formed on an outer side of the first conical surface 22, and the first inner horizontal surface 26 may be formed on an inner side of the first conical surface 22.

An angle between the first conical surface 22 and the first inner horizontal surface 26 may be larger 95 degrees and smaller than 135 degrees.

That is, the first conical surface 22 may require a predetermined angle since an extraction angle should be maintained in a process of injection-molding the lens. In addition, this angle may also be required in order to closely adhere the first lens 20 and the second lens 30 stacked on the first lens 20 or to guide the second lens 30. Therefore, the first conical surface 22 may be configured to be inclined so as to have an angle greater than 95 degrees and less than 135 degrees between the first conical surface 22 and the first inner horizontal surface 26 in order to satisfy all of the above-mentioned requirements.

Therefore, the first lens 20 may have the concave portion 28 formed on the second surface thereof, wherein the concave portion 28 has a shape in which it is depressed by the first conical surface 22 that is inclined and the first inner horizontal surface 26 that is extended inwardly from the first conical surface 22.

As described above, since the first conical surface 22 is inclined upwardly toward the outer side, the first inner horizontal surface 26 may have a shape in which it is relatively depressed as compared with the first outer horizontal surface 24.

The second lens 30 stacked on the first lens 20 may have an annular shape, similar to the first lens 20. The second lens 30 may have an optical axis formed in a central portion thereof and may be disposed so as to maintain the same axis line as the optical axis of the first lens 20 at the time of being closely adhered to the first lens 20.

In a process of closely adhering the second lens 30 to the first lens 20, the second lens 30 may be closely adhered to the first lens 20 without particularly using an adhesive, a tape, or the like. That is, when the plurality of lenses are accommodated in the lens barrel 10, although not shown, a separate structure for significantly decreasing movement of the lenses may be installed in the lens barrel 10 while pressing the uppermost lens, such that the adhesive, the tape, or the like, is not separately required.

The second lens 30 may have the first surface facing the second surface of the first lens 20, and may have a second conical surface 32, a second inner horizontal surface 36, and a second outer horizontal surface 34 formed on the first surface thereof, wherein the second inner horizontal surface 36 and the second outer horizontal surface 34 are formed on both sides of the second conical surface 32, respectively.

For example, the second lens 30 may have the second conical surface 32 formed in a position facing the first conical surface 22 of the first lens 20, the second outer horizontal surface 34 may be formed on an outer side of the second conical surface 32, and the second inner horizontal surface 36 may be formed on an inner side of the second conical surface 32.

Since the second conical surface 32 may have a gradient the same as that of the first conical surface 22, the first conical surface 22 and the second conical surface 32 may be disposed in parallel with each other. In addition, the second conical surface 32 may have a length equal to or shorter than that of the first conical surface 22.

When the first lens 20 and the second lens 30 are stacked and assembled, the first outer horizontal surface 24 and the second outer horizontal surface 34 may face each other, the first conical surface 22 and the second conical surface 32 may face each other, and the first inner horizontal surface 26 and the second inner horizontal surface 36 may face each other.

Here, since the first inner horizontal surface 26 of the first lens 20 has a structure in which it is relatively depressed as compared with the first outer horizontal surface 24, the second inner horizontal surface 36 of the second lens 30 may have a structure in which it protrudes as compared with the second outer horizontal surface 34.

That is, the second lens 30 may have a convex portion 38 formed on the first surface thereof so as to protrude toward the concave portion 28, wherein the convex portion 38 may include the second conical surface 32 that is inclined and the second inner horizontal surface 36 that is extended inwardly from the second conical surface 32.

Here, the first lens 20 and the second lens 30 may have a first air gap 40 formed therebetween so that the second inner horizontal surface 36 is not closely adhered to the first inner horizontal surface 26, but is spaced apart from the first inner horizontal surface 26 by a predetermined distance.

The first air gap 40 may be a space formed in order to accurately focus the first and second lenses 20 and 30.

Meanwhile, the first lens 20 and the second lens 30 may have a separate spacer 70 disposed therebetween, wherein the spacer 70 has an annular shape.

For example, the spacer 70 may be disposed on the first inner horizontal surface 26 of the first lens 20.

Here, since the second inner horizontal surface 36 is disposed so as to be spaced apart from the spacer 70, the first air gap 40 may be a space between the second inner horizontal surface 36 and the spacer 70.

Meanwhile, the first outer horizontal surface 24 of the first lens 20 may be configured so as to be closely adhered to the second outer horizontal surface 34 of the second lens 30.

When the first and second outer horizontal surfaces 24 and 34 are closely adhered to each other as described above, a distance between the respective lenses may be shortened to decrease an entire size and decrease dispersion of resolution.

Since the first air gap 40 is a very important factor in the dispersion of resolution depending on a change thereof, the first air gap 40 may be maintained as a minimum gap in consideration of a tolerance due to the spacer 70 and may be larger than a second air gap 60 to be described below.

Meanwhile, the first and second conical surfaces 22 and 32 may be configured so as to be closely adhered to each other or be spaced apart from each other. When it is assumed that a distance between the first and second conical surfaces 22 and 32 in a direction perpendicular to the optical axis is a decenter 50, the decenter 50 may be equal to or greater than 0 (the decenter 50≥0).

In other words, in the process of stacking the first and second lenses 20 and 30, the first and second lenses 20 and 30 may be stacked in a state in which the second conical surface 32 of the second lens 30 and the first conical surface 22 of the first lens 20 are closely adhered to each other or may be stacked in a state in which the second conical surface 32 of the second lens 30 and the first conical surface 22 of the first lens 20 are spaced apart from each other by a predetermined gap.

As a result, according to an exemplary embodiment of the present disclosure, at the time of stacking the first and second lenses 20 and 30, the first and second outer horizontal surfaces 24 and 34 need to be closely adhered to each other, and the first and second conical surfaces 22 and 32 maybe closely adhered to each other or be spaced apart from each other by a predetermined gap.

Figure 4:
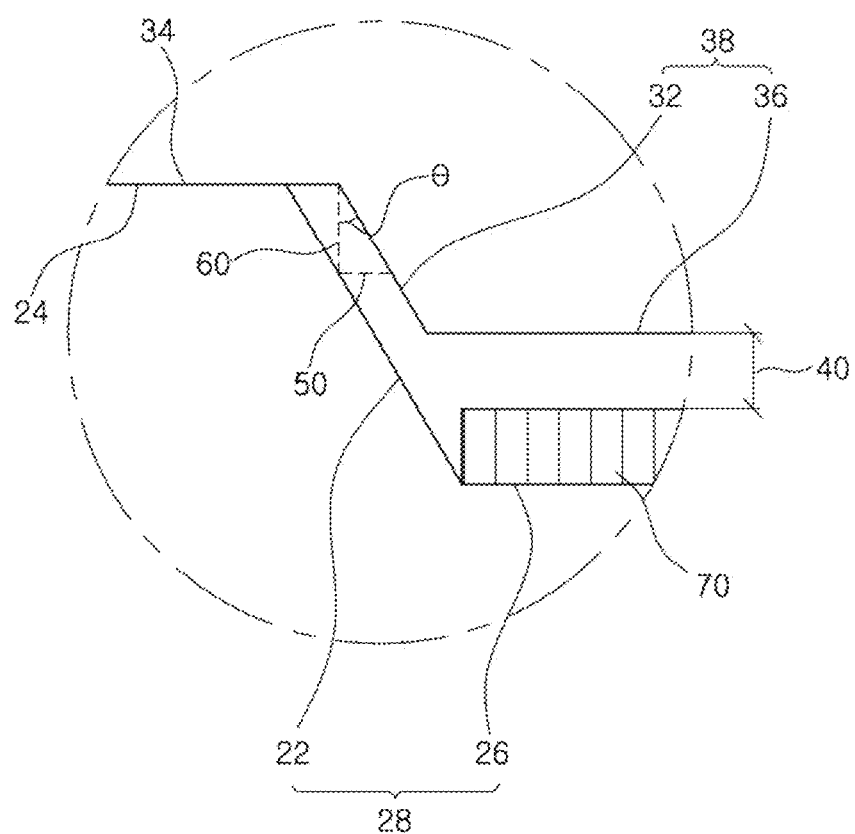
FIG. 4 is a schematic view illustrating a relationship between a second air gap between first and second lenses according to an exemplary embodiment of the present disclosure and a decenter.

FIG. 4 is a schematic view illustrating a relationship between a second air gap between first and second lenses according to an exemplary embodiment of the present disclosure and a decenter.

Referring to FIG. 4, in the case in which the first and second conical surfaces 22 and 32 are spaced apart from each other, since the first and second lenses 20 and 30 have the annular shape, the decenter 50 may be formed on both sides based on the optical axis when viewed from a cross section.

Therefore, a total gap between the first and second lenses 20 and 30 in the direction perpendicular to the optical axis may equal to two times the decenter 50, which is defined as an assembly gap (assembly gap=2×decenter 50).

Here, in the case in which the first and second conical surfaces 22 and 32 are spaced apart from each other, when it is assumed that a distance between the first and second conical surfaces 22 and 32 in an optical axis direction is a second air gap 60, a distance between the first and second conical surfaces 22 and 32 in the direction perpendicular to the optical axis is the decenter 50, and an angle between a line connecting the first and second conical surfaces 22 and 32 to each other in the optical axis direction and the second conical surface 32 is θ, tan θ may be represented by decenter 50/second air gap 60 (tan θ=decenter 50/second air gap 60).

Therefore, the second air gap 60 may be represented by decenter 50/tan θ. Since the decenter 50 is assembly gap/2, the second air gap 60 may be represented by assembly gap/2×tan θ. This may be summarized as follows.

Second Air Gap 60=Decenter 50/tan θ=Assembly Gap/2×tan θ.

The second air gap 60 may be increased or decreased in proportion to a value of the decenter 50 in the case in which θ is constant.

In more detail, it may be appreciated from FIG. 4 showing a relation between the second air gap 60 and the decenter 50 that when θ is constant, the decenter 50 is increased as the second air gap 60 is increased.

In addition, it may be appreciated that in the case in which the decenter 50 is constant, tan θ is decreased as the second air gap 60 is increased.

Meanwhile, in the lens module 100 according to an exemplary embodiment of the present disclosure, the second air gap 60 may be larger than the decenter 50.

Therefore, tan θ may be smaller than 1 (that is, tan θ<1, θ<45°).

As described above, the first and second conical surfaces 22 and 32 need to be formed so as to have a predetermined angle in order to easily separate the lens from a mold in a process of injection-molding the lens. Here, in the case in which an angle formed by the optical axis and the first conical surface 22 or the second conical surface 32 is 45 degrees or more, the lens may be easily separated from the mold; however, it may be difficult to dispose an optical axis of the first lens 20 and an optical axis of the second lens 30 on the same axis line at the time of assembling the respective lenses.

The reason is that in the case in which the angle formed by the optical axis and the first conical surface 22 or the second conical surface 32 is 45 degrees or more, the decenter 50 becomes larger than the second air gap 60, such that it is difficult to manage the decenter 50.

However, as in the lens module 100 according to an exemplary embodiment of the present disclosure, when the angle formed by the optical axis and the first conical surface 22 or the second conical surface 32 is less 45 degrees to allow the second air gap 60 to be larger than the decenter 50, the lens may be easily separated from the mold in the process of injection-molding the lens, and the optical axis of the first lens 20 and the optical axis of the second lens 30 may be easily disposed on the same axis line at the time of assembling the respective lenses.

In more detail, the angle formed by the optical axis and the first conical surface 22 or the second conical surface 32 (alternatively, the angle between the line connecting the first and second conical surfaces 22 and 32 to each other in the optical axis direction and the second conical surface 32) may be preferably 15 degrees or more to 25 degrees or less.

Figure 5:
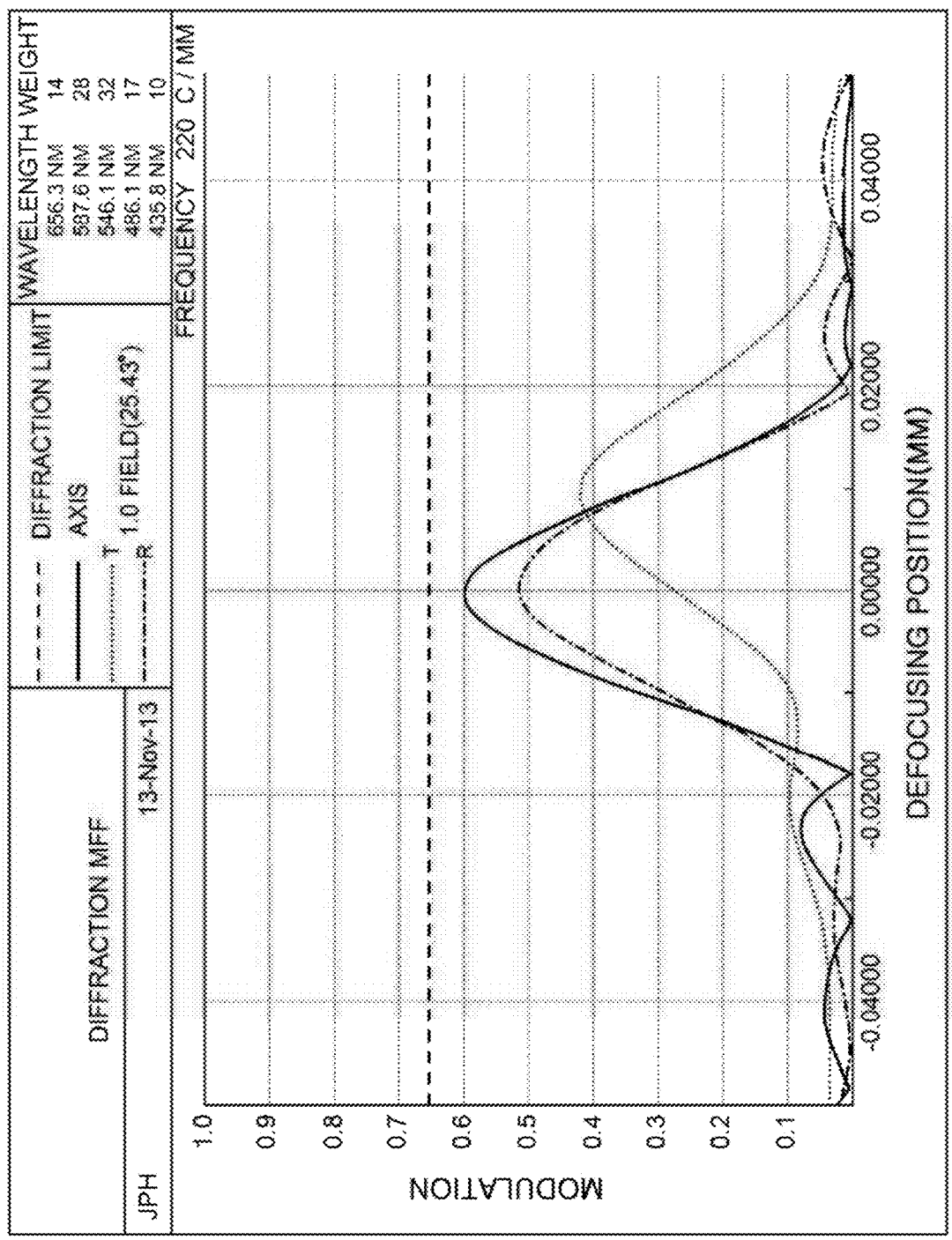
FIG. 5 is a graph illustrating a change in dispersion of resolution depending on a change in a second air gap.

FIG. 5 is a graph illustrating a change in dispersion of resolution depending on a change in a second air gap.

It may be appreciated from the graph of FIG. 5 that when the second air gap 60 becomes excessively large (that is, the second air gap 60 is larger than the decenter 50), the dispersion of the resolution is biased toward the right as compared with a design value, such that the resolution is decreased.

Therefore, in the lens module 100 according to an exemplary embodiment of the present disclosure, the second air gap 60 may be maintained so as to be smaller than the decenter 50, thereby implementing high resolution.

In addition, in the lens module 100 according to an exemplary embodiment of the present disclosure, in the case in which the plurality of lenses are stacked in the lens barrel 10, the lenses are stacked in the same manner as the structure in which the first and second lenses 20 and 30 are stacked, such that the first and second air gaps 40 and 60 may be maintained without being changed through the close adhesion between the first and second outer horizontal surfaces 24 and 34, whereby generation of the dispersion of the resolution may be significantly decreased.

As set forth above, with the lens module according to an exemplary embodiment of the present disclosure, close adhesion and adhesive force of lenses stacked in a multi-stage scheme are increased, whereby the dispersion of the resolution of the lenses may be decreased, and the lenses stacked in the multistage scheme are closely adhered to each other, whereby the lens barrel may be more compactly configured.

While exemplary embodiments have been shown and described above, it will be apparent to those skilled in the art that modifications and variations could be made without departing from the scope of the present invention as defined by the appended claims.

What is claimed is:

1. A lens module comprising:
a first lens having a concave portion formed on an image-side surface of the first lens, the concave portion comprising: an inclined first conical surface, and a first inner horizontal surface that is extended inwardly from the first conical surface; and
a second lens having a convex portion formed on an object-side surface of the second lens and protruding toward the concave portion of the first lens, the convex portion comprising: an inclined second conical surface, and a second inner horizontal surface that is extended inwardly from the second conical surface;
wherein the first and second lenses are in contact with each other at a region outside of the concave portion of the first lens and the convex portion of the second lens, and the concave portion of the first lens and the convex portion of the second lens are not in contact with each other; and
wherein a first gap, disposed between the concave portion of the first lens and the convex portion of the second lens in an optical axis direction, is different from a second gap, disposed between the concave portion of the first lens and the convex portion of the second lens in a direction perpendicular to an optical axis.

2. The lens module of claim 1, wherein the second gap, disposed between the first and second conical surfaces in the direction perpendicular to the optical axis, is smaller than the first gap, disposed between the first and second inner horizontal surfaces.

3. The lens module of claim 1, wherein the first gap, disposed between the first and second conical surfaces in the optical axis direction, is different from the second gap, disposed between the first and second conical surfaces in the direction perpendicular to the optical axis.

4. The lens module of claim 3, wherein the first gap, disposed between the first and second conical surfaces in the optical axis direction, is larger than the second gap, disposed between the first and second conical surfaces in the direction perpendicular to the optical axis.

5. The lens module of claim 3, wherein the relationship $\theta<45$ degrees is satisfied for an angle $\theta$ disposed between the second conical surface and a line connecting the first conical surface and second conical surface in the optical axis direction.

6. The lens module of claim 3, wherein the relationship $\tan\theta<1$ is satisfied for an angle $\theta$ disposed between the second conical surface and a line connecting the first conical surface and second conical surface in the optical axis direction.

7. A lens module comprising:
a first lens having
an inclined first conical surface,
a first inner horizontal surface, and
a first outer horizontal surface formed on an image-side surface of the first lens,
wherein the first inner horizontal surface and the first outer horizontal surface are respectively formed on distinct sides of the first conical surface; and
a second lens stacked together with, and assembled with, the first lens in an optical axis direction, and having
an inclined second conical surface,
a second inner horizontal surface, and
a second outer horizontal surface formed on an object-side surface of the second lens, facing the image-side surface of the first lens,
wherein the second inner horizontal surface and the second outer horizontal surface are respectively formed on distinct sides of the second conical surface;
wherein the first and second inner horizontal surfaces are not in contact with each other, and form a first air gap,
wherein the first and second conical surfaces are not in contact with each other, and form a second air gap,
wherein a decenter is a distance between the first and second conical surfaces in a direction perpendicular to an optical axis, and
wherein a distance in the second air gap, between the first and second conical surfaces in the optical axis direction, is larger than the decenter.

8. The lens module of claim 7, wherein the first and second outer horizontal surfaces are in contact with each other.

9. The lens module of claim 7, wherein the relationship $\theta<45$ degrees is satisfied for an angle $\theta$ disposed between the second conical surface and a line connecting the first conical surface and second conical surface in the optical axis direction.

10. The lens module of claim 7, wherein the relationship $\tan\theta<1$ is satisfied for an angle $\theta$ disposed between the second conical surface and a line connecting the first conical surface and second conical surface in the optical axis direction.

11. The lens module of claim 7, wherein the first and second conical surfaces are disposed in parallel with each other.

12. The lens module of claim 7,
wherein a first distance in the second air gap is disposed between the first and second conical surfaces in the optical axis direction,
wherein a decenter is a second distance, disposed between the first and second conical surfaces in a direction perpendicular to an optical axis,
wherein an angle $\theta$ is disposed between the second conical surface and a line connecting the first conical surface and second conical surface in the optical axis direction, and
wherein when $\theta$ is constant, the first distance is less than or greater than the decenter.

13. The lens module of claim 7, wherein the first air gap is larger than the second air gap.

* * * * *